April 21, 1931.    V. BENDIX    1,801,408

BRAKE MECHANISM

Filed Dec. 12, 1927

INVENTOR
VINCENT BENDIX
BY
Jn. W. McConkey
ATTORNEY

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

BRAKE MECHANISM

Application filed December 12, 1927. Serial No. 239,447.

This invention relates to brakes, and is illustrated as embodied in an internal expanding brake for an automobile. An object of the invention is to provide a simple and inexpensive brake which is exceedingly powerful in action.

One important feature of the invention is to provide for centering friction means comprising three or more connected shoes, when the brake is released, by means acting directly on the two end shoes and acting on the central shoe indirectly through the joints connecting it to the end shoes. Preferably the positioning means includes stops for the end shoes, which stops may be adjustable, and which are illustrated as being automatically set by the application of the brake.

The above and other objects and features of the invention, including various novel and desirable details of construction, will be apparent from the following description of the illustrative embodiment shown in the accompanying drawing, in which.

Figure 1:
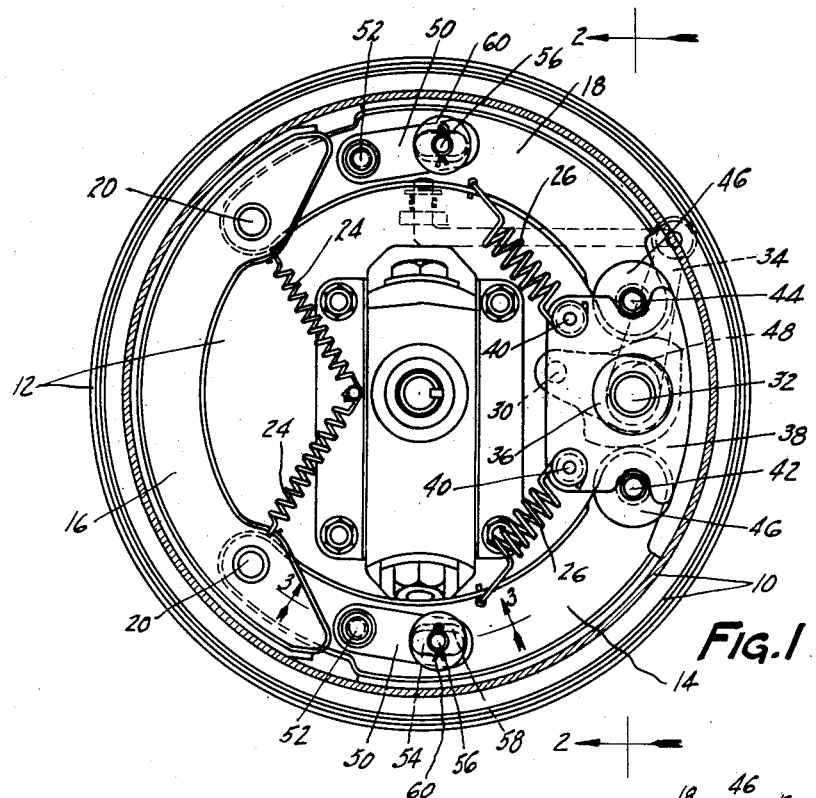
Figure 1 is a vertical section through the brake, just inside the head of the brake drum, showing the brake shoes in side elevation.

In the illustrated arrangement, the brake includes a rotatable drum 10, at the open side of which is a stationary support such as a backing plate 12, and within which is arranged the friction means of the brake. Preferably the friction means includes at least three shoes 14, 16, and 18, arranged substantially end to end, the end shoes 14 and 18 being connected to the opposite ends of the central shoe 16 by means such as joints or pivots 20.

The illustrated shoes 14 and 18, which are interchangeable, are subtsantially T shaped in cross-section, being built up by fastening together two angle-section steel stampings, back to back. The illustrated central shoe 16 is also built up of such stampings welded or riveted back to back, but in this case the stampings are spread apart at opposite ends of the shoe to form forks straddling, the ends of shoes 14 and 18. This shoe structure is substantially as described and claimed in Patent No. 1,630,060, granted Bendix Brake Company on May 24, 1927, and does not in itself form any part of the present invention.

Return springs 24 urge the shoe 16, and the ends of shoes 14 and 16, away from the drum.

The brake is applied, against the resistance of auxiliary return springs 26, by means such as a pair of floating cams 28, extended radially inward and connected by a pivot 30 to an arm fixed on a shaft 32 operated by a lever 34. Shaft 32 is journaled in two stamped bearings 36 spot-welded to two anchor plates 38 secured to the backing plate 12 by posts or studs 40. Plates 38 are notched at their ends to receive thrust pins or pivots 42 and 44, mounted crosswise of the ends of shoes 14 and 18 respectively, and carrying rollers 46 engaged by the cams 28. Cams 28 are formed with relatively large openings 48 for shaft 32, so that the shaft does not interfere with the shifting of the cams as the friction means anchors on pin 42 or pin 44, according as the drum is turning counter-clockwise or clockwise in Figure 1 at the time the brake is applied.

The above-described applying and anchoring means is more fully described, and is claimed, in my prior application No. 159,806, filed January 8, 1927.

Figure 3:
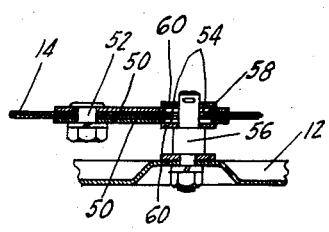
Figure 3 is a partial section through one of the stops for the end shoes, on the line 3—3 of Figure 1.
Figure 2:
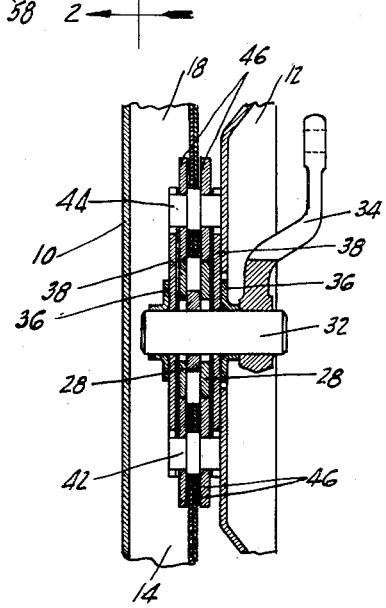
Figure 2 is a partial section, through the applying means, on the line 2—2 of Figure 1.

According to an important feature of the present invention, the released positions of the shoes is determined by means, such as the stops shown in detail in Figure 3, engaging the end shoes directly and positioning the central shoe indirectly through the joints 20.

The particular stops illustrated, and the detailed construction of which is not claimed in the present application, include plates 50 on opposite sides of the webs of shoes 14 and 18. Each pair of plates 50 is frictionally gripped to the web of its shoe, at the ends opposite the cams 28, by means such as a clamp bolt 52. The other ends of each pair of plates 50 are formed with slots 54, embracing the reduced-diameter end portion of a fixed post or steady-rest 56 secured to the backing plate 12. The shoe web is formed with a relatively large opening 58 for the passage of the steady-rest 56.

The steady-rest 56 may, if desired, be provided with washers 60, confining the shoe laterally without interfering with its movement toward and from the drum. One washer 60 rests against a shoulder of the steady-rest, while the other is held by a cotter pin.

The slots 54 are just enough wider than the diameter of steady-rest 56 to permit a lost motion equal to the desired releasing movement of the shoe before the lining has begun to wear. Therefore, the first time the brake is applied, the plates 50 are shifted, against the frictional resistance of bolts 52, by engagement with steady-rests 56, to such a position that they engage these steady-rests again, on the opposite sides of slots 54, when the brake is released, thus determining the released positions of the shoes. In the particular arrangement illustrated, after the lining of the shoes has worn considerably, the plates 50 are shifted to new positions each time the brake is applied, and are again shifted by springs 26 and 24 when the brake is released, in such a manner as to position the shoes centrally with respect to the drum,—i. e. so that shoes 14 and 18 have equal clearances.

While one illustrative embodiment has been described in detail, it is not my intention to limit the scope of the invention to that particular embodiment, or otherwise than by the terms of the appended claims.

I claim:

1. A brake comprising three shoes arranged end to end and connected by floating joints, in combination with positioning means acting directly on the two end shoes to determine their released positions and acting through said joints on the central shoe to determine its released position.

2. A brake comprising, in combination, a drum, at least three connected floating shoes engageable with the drum and anchoring on one end shoe when the drum is turning in one direction and anchoring on the other end shoe when the drum is turning in the other direction, and positioning means engaging the two end shoes acting as the sole means to determine the released positions of the three shoes.

3. A brake comprising, in combination, a drum, three connected floating shoes engageable with the drum and anchoring on one end shoe when the drum is turning in one direction and anchoring on the other end shoe when the drum is turning in the other direction, and a stop determining the released position of each end shoe, the released position of the central shoe being determined by the two end shoes.

4. A brake comprising, in combination, a drum, three connected floating shoes engageable with the drum, and a friction stop determining the released position of each end shoe, the released position of the central shoe being determined by the two end shoes.

5. A brake comprising, in combination, a drum, at least three connected floating shoes engageable with the drum and anchoring on one end shoe when the drum is turning in one direction and anchoring on the other end shoe when the drum is turning in the other direction, and an automatically adjustable stop determining the released position of each end shoe, the released position of the central shoe being determined by the two end shoes.

6. A brake comprising, in combination, a drum, at least three connected floating shoes engageable with the drum, and an adjustable stop determining the released position of each end shoe, the released position of the central shoe being determined by the two end shoes, said stops being set automatically by the application of the brake.

7. A brake comprising in combination a drum, a plurality of connected floating shoes engageable with the drum, two of said adjacent shoes being spaced apart to define end shoes, and a stop determining the released position of each end shoe, the released position of the friction means intermediate the end shoes being determined by said end shoes, said stops being set automatically by the application of the brake.

In testimony whereof, I have hereunto signed my name.

VINCENT BENDIX.